United States Patent
Ho

(10) Patent No.: US 9,699,007 B2
(45) Date of Patent: Jul. 4, 2017

(54) PIPELINE MULTIPLEXER LOOP ARCHITECTURE FOR DECISION FEEDBACK EQUALIZER CIRCUITS

(71) Applicant: HUAWEI TECHNOLOGIES CO., LTD., Shenzhen (CN)

(72) Inventor: Huong Ho, Woodlawn (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/840,500

(22) Filed: Aug. 31, 2015

(65) Prior Publication Data
US 2017/0063576 A1     Mar. 2, 2017

(51) Int. Cl.
*H03K 5/159*     (2006.01)
*H04L 25/03*     (2006.01)

(52) U.S. Cl.
CPC ............... *H04L 25/03057* (2013.01)

(58) Field of Classification Search
CPC ..... H04L 25/03057; H04L 2025/03363; H04L 2025/0349; H04L 2025/03617; H03H 7/30
USPC ................. 375/233, 229, 230, 232
See application file for complete search history.

(56) References Cited

U.S. PATENT DOCUMENTS

| | | | |
|---|---|---|---|
| 6,192,072 B1 * | 2/2001 | Azadet | H04L 25/03057 375/233 |
| 6,363,112 B1 * | 3/2002 | Azadet | H04L 25/03057 375/232 |
| 7,333,580 B2 | 2/2008 | Parhi | |
| 7,839,922 B2 | 11/2010 | Chung et al. | |
| 8,126,045 B2 | 2/2012 | Bulzacchelli et al. | |
| 8,457,190 B2 | 6/2013 | Raghavan et al. | |
| 8,699,558 B1 * | 4/2014 | Wang | H04L 25/03057 375/233 |

(Continued)

FOREIGN PATENT DOCUMENTS

| CN | 101340408 A | 1/2009 |
|---|---|---|
| CN | 102301665 A | 12/2011 |

OTHER PUBLICATIONS

K. K. Parhi, "Pipelining in Algorithms with Quantizer Loops," IEEE Trans. on Circuits and Systems, 38(7), pp. 745-754, Jul. 1991.

(Continued)

*Primary Examiner* — Helene Tayong
(74) *Attorney, Agent, or Firm* — Norton Rose Fulbright Canada LLP

(57) ABSTRACT

Circuits, devices, methods for decision feedback equalization are described. A decision feedback circuit can include a plurality of decision feedback equalizer (DFE) branches, each DFE branch including: a pre-computation stage for generating a set of tap-adjusted inputs, each tap-adjusted input corresponding to a possible value of a previous output for the same DFE branch; and a decision feedback stage including a multiplexer circuit for selecting at least one output from the set of tap-adjusted inputs based on tap-adjusted inputs from other DFE branches. For at least a first DFE branch of the plurality of DFE branches, at least one selection line for the multiplexer circuit in the decision feedback stage of at least the first DFE branch of the plurality of DFE branches is an intermediate value from a multiplexer circuit for a second DFE branch of the plurality of DFE branches.

23 Claims, 7 Drawing Sheets

(56) References Cited

U.S. PATENT DOCUMENTS

| | | | |
|---|---|---|---|
| 2006/0182172 A1* | 8/2006 | Lin | H04L 25/03057 |
| | | | 375/233 |
| 2007/0140329 A1 | 6/2007 | Zhang et al. | |
| 2009/0010320 A1 | 1/2009 | Hollis | |
| 2010/0104000 A1* | 4/2010 | Pozzoni | H04L 25/0307 |
| | | | 375/233 |
| 2010/0202506 A1* | 8/2010 | Bulzacchelli | H04L 25/03057 |
| | | | 375/233 |

OTHER PUBLICATIONS

K. K. Parhi, "Pipelining of Parallel Multiplexer Loops and Decision Feedback Equalizers," Proc. of the ICASSP 2004, pp. V-21-V-24, 2004.

* cited by examiner

PIPELINE MULTIPLEXER LOOP ARCHITECTURE FOR DECISION FEEDBACK EQUALIZER CIRCUITS

FIELD

This disclosure relates generally to the field of electronic signal processing circuits, and more particularly to decision feedback circuits.

BACKGROUND

Equalization techniques can be used to improve signal quality or correct digital signals. In digital feedback loops, loop unrolling is a technique that pre-calculates all possible combinations of filter multiplications and additions in advance of selecting an output based on previous outputs. For a parallel circuit, the output of each branch must be valid within a single clock period, so as the number parallel branches increases, the speed of the unrolled loops may be limited.

In loop unfolding, L levels of look-ahead expansion are performed on the unrolled architecture to create a parallel architecture. As the number of levels L increase, the resulting size of the parallel architecture can be large and may also limit speed.

Smaller and faster decision feedback circuits would be beneficial.

SUMMARY

In accordance with one aspect, there is provided a decision feedback circuit including a plurality of decision feedback equalizer (DFE) branches. Each DFE branch includes: a pre-computation stage configured to generate a set of tap-adjusted inputs, each tap-adjusted input corresponding to a possible value of a previous output for the same DFE branch; and a decision feedback stage comprising a multiplexer circuit configured to select at least one output from the set of tap-adjusted inputs based on tap-adjusted inputs from other DFE branches. For at least a first DFE branch of the plurality of DFE branches, at least one selection line for the multiplexer circuit in the decision feedback stage of at least the first DFE branch of the plurality of DFE branches is an intermediate value from a multiplexer circuit for a second DFE branch of the plurality of DFE branches.

In accordance with another aspect, there is provided a method for decision feedback equalization. The method includes: for at least a first decision feedback equalizer (DFE) branch of a plurality of DFE branches in a decision feedback circuit: generating a set of tap-adjusted inputs, each tap-adjusted input corresponding to a possible value of a previous output for at least the first DFE branch of the plurality of DFE branches; and selecting, with a multiplexer circuit of at least the first DFE branch of the plurality of DFE branches, at least one output from the set of tap-adjusted inputs based on at least one intermediate value from a multiplexer circuit for a second DFE branch.

In accordance with another aspect, there is provided an electronic device. The electronic device includes: a plurality of decision feedback equalizer (DFE) branches. Each DFE branch includes: a pre-computation stage configured to generate a set of tap-adjusted inputs, each tap-adjusted input corresponding to a possible value of a previous output for the same DFE branch; and a decision feedback stage comprising a multiplexer circuit configured to select at least one output from the set of tap-adjusted inputs based on tap-adjusted inputs from other DFE branches. For at least a first DFE branch of the plurality of DFE branches, at least one selection line for the multiplexer circuit in the decision feedback stage of at least the first DFE branch of the plurality of DFE branches is an intermediate value from a multiplexer circuit for a second DFE branch of the plurality of DFE branches In accordance with another aspect, there is provided a decision feedback circuit. The decision feedback circuit includes a first decision feedback equalizer (DFE) branch. The first DFE branch includes: a pre-computation stage configured to generate a set of tap-adjusted inputs, each tap-adjusted input corresponding to a possible value of a previous output for the first DFE branch; and a decision feedback stage comprising a multiplexer circuit configured to select at least one output from the set of tap-adjusted inputs based on tap-adjusted inputs from other DFE branches. At least one selection line for the multiplexer circuit is an intermediate value from a multiplexer circuit for a second DFE branch.

In accordance with another aspect, there is provided a decision feedback circuit. The decision feedback circuit includes a first decision feedback equalizer (DFE) branch. The first DFE branch includes: a pre-computation stage configured to generate a set of tap-adjusted inputs, each tap-adjusted input corresponding to a possible value of a previous output for the first DFE branch; and a decision feedback stage comprising a multiplexer circuit configured to select at least one output from the set of tap-adjusted inputs based on tap-adjusted inputs from other DFE branches. An output of at least a first multiplexer in the multiplexer circuit is an input to a second multiplexer in the multiplexer circuit and is an input to at least one selection line in a decision feedback stage of a second DFE branch.

Many further features and combinations thereof concerning the present improvements will appear to those skilled in the art following a reading of the instant disclosure.

DESCRIPTION OF THE FIGURES

Embodiments will now be described, by way of example only, with reference to the attached figures, wherein.

These drawings depict aspects of example embodiments for illustrative purposes, and variations, alternative configurations, alternative components and modifications may be made to these example embodiments.

DETAILED DESCRIPTION

The present disclosure relates generally to circuits, methods and devices for decision feedback equalization. Embodiments of the present disclosure may, in some examples, result in a potentially smaller, faster and/or simpler multiplexer loop architecture. In some examples, application of multiplexer loop architectures described herein may allow for greater parallelization, higher clock speeds, and/or higher throughputs in parallel processing decision feedback circuits.

Figure 1A:
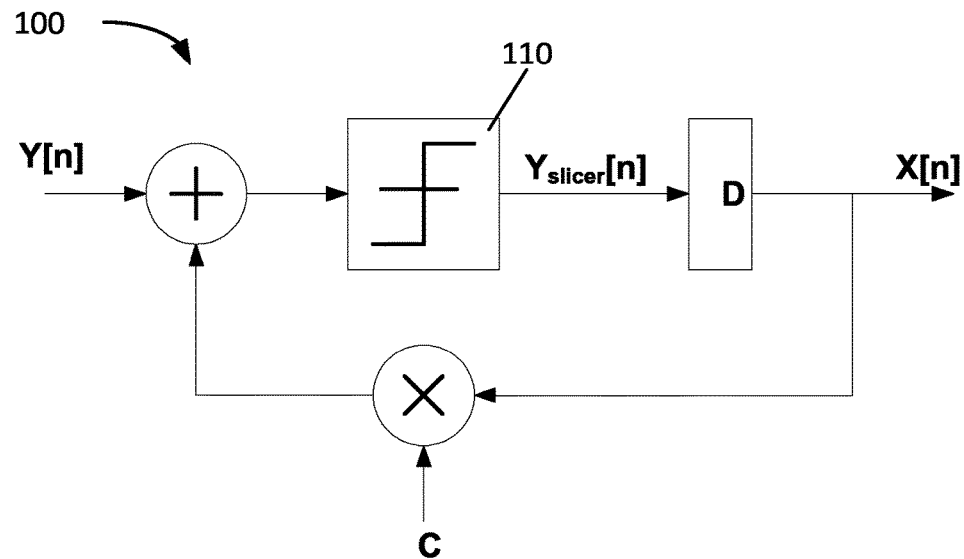
FIGS. 1A, 1B are schematic diagrams of example 1-Tap DFE circuits with feedback.

FIG. 1A shows an example circuit 100 illustrating a serial single-tap (1-tap) decision feedback equalizer (DFE) filter with a feedback loop where the output X[n] is based on the quantized value of the input Y[n] as adjusted by the previous output value X[n−1] multiplied by tap coefficient C. In this example, the quantizer 110 (sometimes referred to as a slicer) is a 2-level quantizer.

Figure 1B:
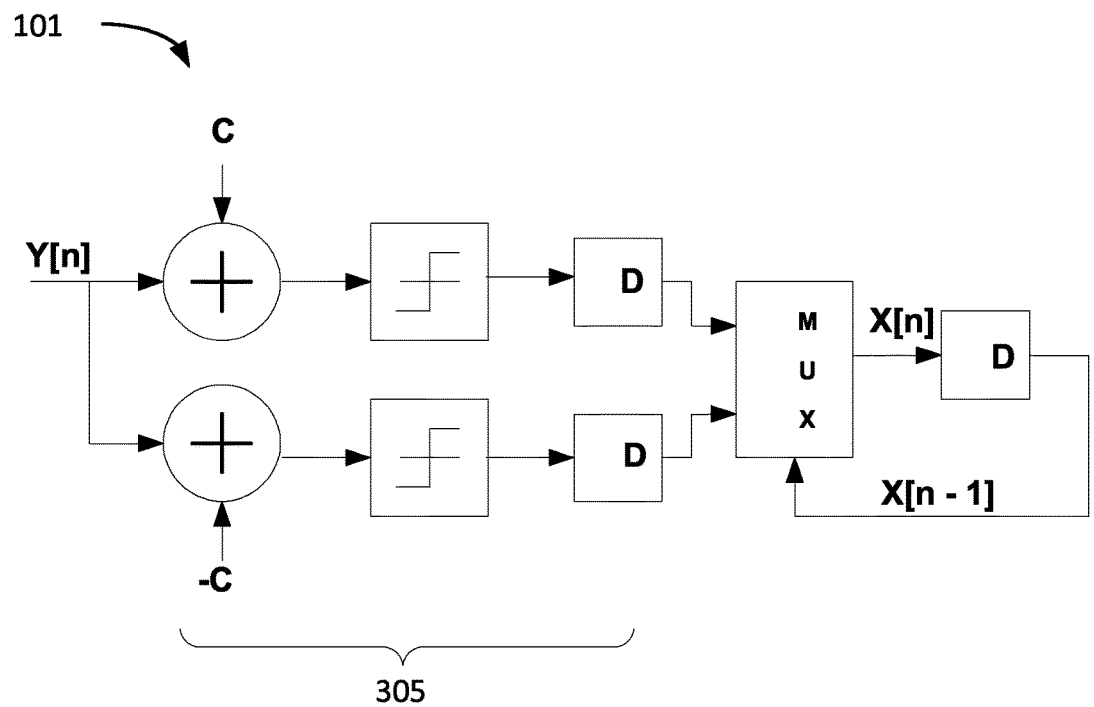

FIG. 1B shows an example circuit 101 where the circuit 100 of FIG. 1A has been unrolled by precalculating adjusted input values for each possible previous output value X[n−1] as modified by corresponding coefficient values, and selecting the appropriate pre-computed entry based on the previous output value X[n−1].

Loop unfolding is an alternative architecture where L levels of look-ahead expansion can be performed on the unrolled architecture to create a parallel architecture. In some examples, this architecture may be suitable for high throughput performance applications.

Figure 2A:
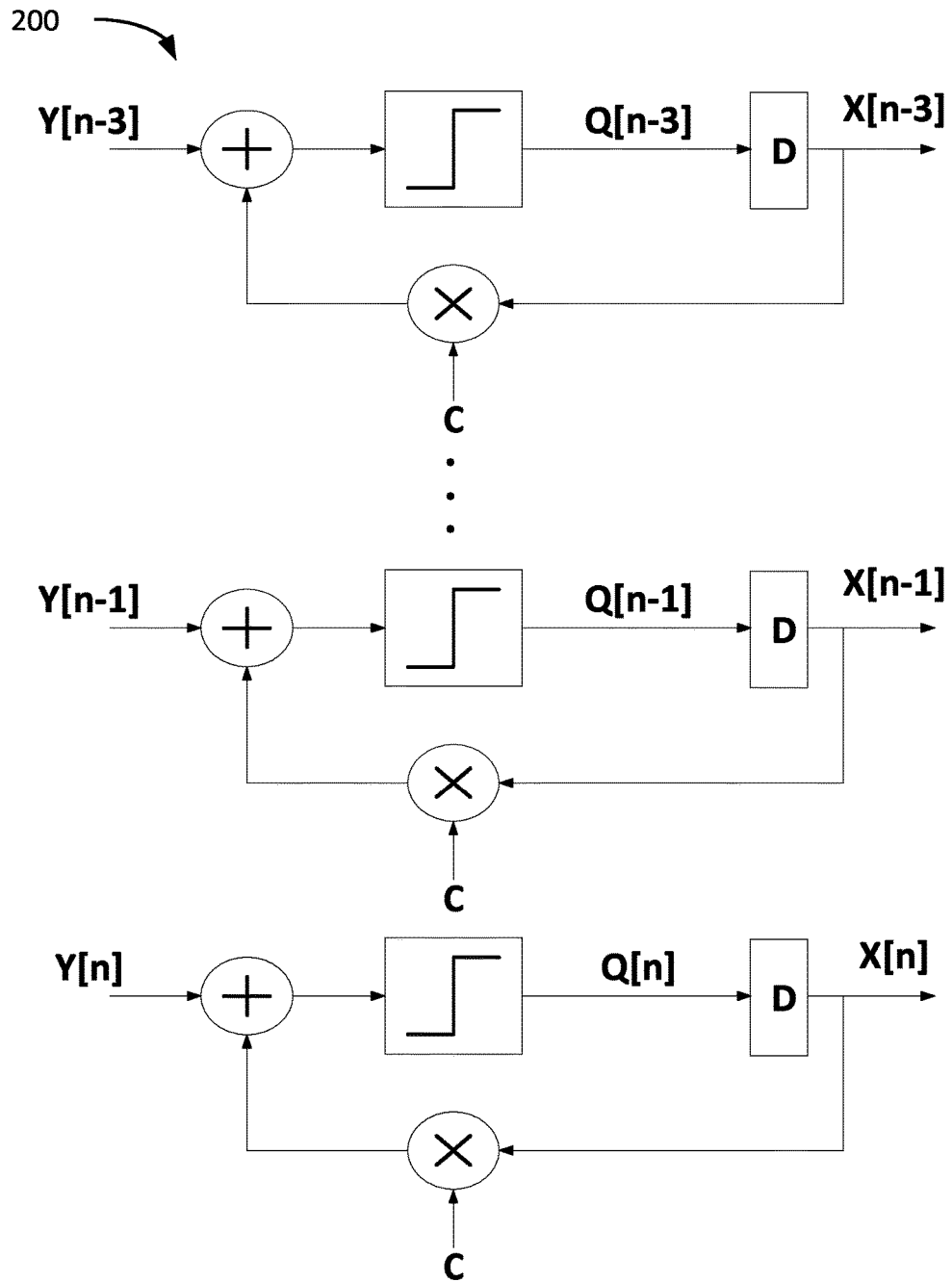
FIGS. 2A, 2B are schematic diagrams of example 1-Tap DFE circuits with L=4 DFE branches operating in parallel.
Figure 2B:
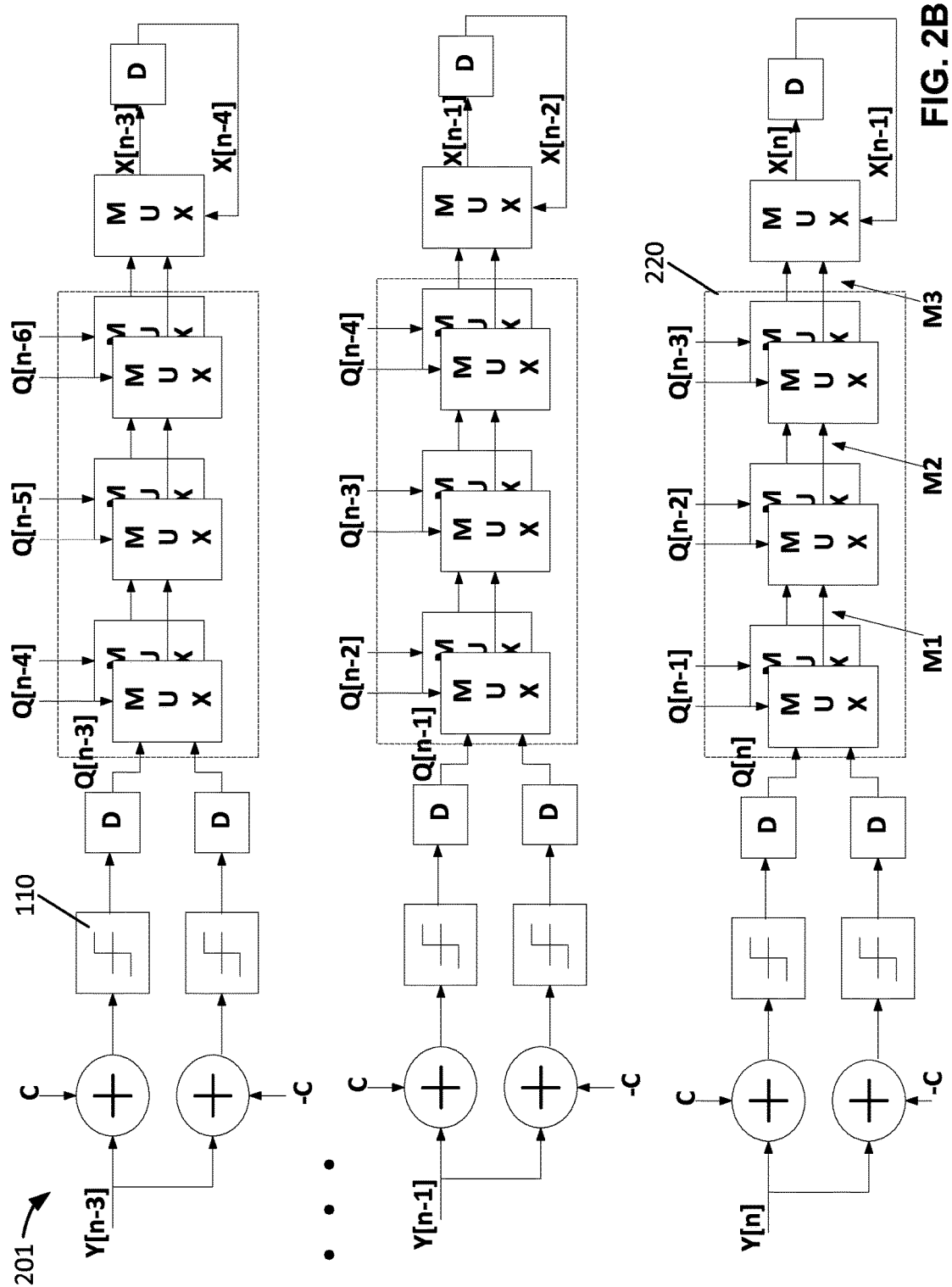

FIG. 2A shows an example circuit 200 having 4 DFE filters (Y[n−2] branch not shown) operating in parallel. FIG. 2B shows an example of a corresponding unfolded architecture 201 of the DFE system depicted in FIG. 2A (Y[n−2] not shown), having L=4 levels of look-ahead expansion. As shown in FIG. 2B, the quantizer 110 output of the DFE filters on stages K−1, . . . , K−L−1 (e.g. Q[n−1], Q[n−2], Q[n−2], etc.) are the inputs to the control lines of the multiplexer (MUX) network 220 for the filter on stage K.

This pipeline multiplexer loop (PML) architecture for multiple 1-tap DFE filters operated in parallel may result in a design with very long delay. For example, the total delay for the signals Q[n] to propagate to the output of the last MUX in the MUX network 220 of the unfolded architecture depicted in FIG. 2B with L=4 would equal 3 levels of 2-to-1 MUX delays. Generally, the total delay of the MUX network based on a PML architecture (as illustrated in the FIG. 2B example) with L DFE filters would equal L−1 levels of 2-to-1 MUX delays. This delay may become increasingly significant as L increases.

In addition to the time delays, as L increases, the unfolded PML architecture illustrated in FIG. 2B, may require a large area to accommodate the large MUX array. For example, for the system 210 in FIG. 2B which has two possible values (e.g. +1, −1), the PML network has six 2-to-1 MUXs for each of the 4 branches, or a total of 24 MUXs in the PML array. More generally, the two possible value 1-tap system may include 2×(L−1)×L MUXs.

For a system with L=32, this PML architecture can have a MUX array propagation delay of thirty-one 2-to-1 MUX delays, and require sufficient chip area for 1984 MUXs.

For systems with a large number of levels L, the delays due to the PML array may become a timing bottleneck on the DFE circuits, and may have a large cost in terms of chip area and manufacturing costs. Embodiments described herein may, in some examples, reduce the total delay and size of the PML architecture relative to, for example, the architecture in FIG. 2B.

Figure 3:
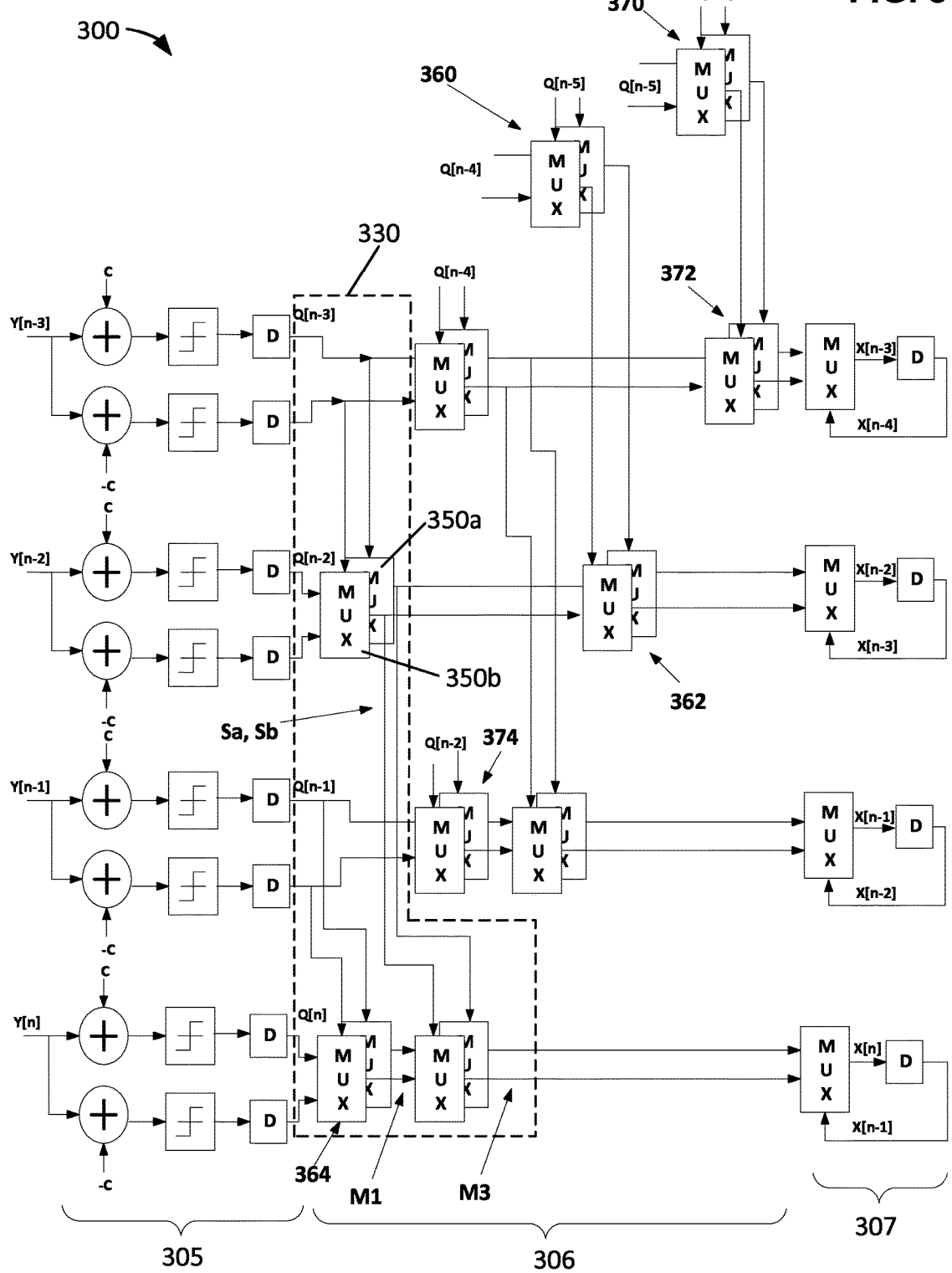
FIG. 3 is a schematic diagram showing aspects of an example 1-Tap DFE with 2 levels of quantization.

FIG. 3 shows an example single-tap circuit 300 having L=4 DFE filters with two levels of quantization. In some embodiments, by using intermediate MUX outputs from one branch to control MUX(s) in another branch, the total number of MUXs in the PML array may be reduced. In some embodiments, this may also reduce the number of MUXs through which the quantizer 110 outputs Q must propagate, thereby reducing the corresponding delays.

By way of example, referring again to FIG. 2A, the quantizer outputs Q[n], . . . , Q[n−3] may be described by the following equations:

$$Q[n-i] = \text{Quant}\{Y[n-i] + FBF[n-i]\}$$

$$FBF[n-i] = C*X[n-i-1]$$

$$i = 0, \ldots, 3 \quad (1)$$

Where the quantizer output Q[n−i] is the quantized value of the current input Y[n−i] as adjusted by the feedback filter value FBF[n−i]. The feedback filter value is the branch's previous output X[n−i−1] multiplied by tap coefficient C. The expression Quant{ } represents the function of the quantizer 110 to quantize an input to the quantizer into one of a set of possible output values.

In some embodiments, the tap coefficients C may be based on measured, calculated or otherwise obtained correction factors.

In some embodiments, no correction factor may be applied. This may be implemented, for example, by assigning to C a value of 1.

Referring, by example, to FIG. 2B, for a design with 2 possible values of −1 and +1, unrolling the architecture provides:

$$Q[n-i] = \begin{cases} \text{Quant}\{Y[n-i] - C\} & X[n-i-1] = -1 \\ \text{Quant}\{Y[n-i] + C\} & X[n-i-1] = +1 \end{cases} \quad (2)$$

As illustrated in FIG. 2B, in the branch corresponding to input Y[n], the output of the MUX network M3 is dependent on the quantizer outputs Q[n−i] from other branches namely Q[n−1], Q[n−2] and Q[n−3].

By defining $Q_a[n] = \text{Quant}\{Y[n] - C\}$ and $Q_b[n] = \text{Quant}\{Y[n] + C\}$, equation (2) becomes:

$$Q[n-i] = \begin{cases} Q_a[n-i] & X[n-i-1] = -1 \\ Q_b[n-i] & X[n-i-1] = +1 \end{cases} \quad (3)$$

The signals at the output M1 referenced as $M_{1,a}[n]$ and $M_{1,b}[n]$ of the MUX network on row i=0 can be calculated by:

$$M_{1,a}[n] = Q_a[n-1]Q_a[n] + \overline{Q_a[n-1]}Q_b[n]$$

$$M_{1,b}[n] = Q_b[n-1]Q_a[n] + \overline{Q_b[n-1]}Q_b[n] \quad (4)$$

Similarly, the output M2 and M3 can be calculated by:

$$M_{2,a}[n] = Q_a[n-2]M_{1,a}[n] + \overline{Q_a[n-2]}M_{1,b}[n]$$

$$M_{2,b}[n] = Q_b[n-2]M_{1,a}[n] + \overline{Q_b[n-2]}M_{1,b}[n] \quad (5)$$

and $$M_{3,a}[n] = Q_a[n-3]M_{2,a}[n] + \overline{Q_a[n-3]}M_{2,b}[n]$$

$$M_{3,b}[n] = Q_b[n-3]M_{2,a}[n] + \overline{Q_b[n-3]}M_{2,b}[n] \quad (6)$$

Substituting equation (5) into equation (6):

$$M_{3,a}[n] = Q_a[n-3](Q_{a,n-2}M_{1,a} + \overline{Q_{a,n-2}}M_{1,b}) +$$

-continued $$M_{3,a}[n] = Q_{a,n-3}Q_{a,n-2}M_{1,a} + Q_{a,n-3}\overline{Q_{a,n-2}}M_{1,b} + \overline{Q_a[n-3]}(Q_{b,n-2}M_{1,a} + \overline{Q_{b,n-2}}M_{1,b})$$

$$M_{3,a}[n] = \overline{Q_{a,n-3}}Q_{b,n-2}M_{1,a} + \overline{Q_{b,n-2}}M_{1,b}Q_{a,n-3}$$

$$M_{3,a}[n] = M_{1,a}\underbrace{(Q_{a,n-3}Q_{a,n-2} + \overline{Q_{a,n-3}}Q_{b,n-2})}_{S} +$$

$$M_{1,b}\underbrace{(Q_{a,n-3}\overline{Q_{a,n-2}} + \overline{Q_{a,n-3}}\overline{Q_{b,n-2}} + Q_{a,n-2}\overline{Q_{b,n-2}})}_{S}$$

Since $\overline{Q_{a,n-2}Q_{b,n-2}}=0$, this simplifies to:

$$M_{3,a}[n] = M_{1,a}\underbrace{(Q_{a,n-3}Q_{a,n-2} + \overline{Q_{a,n-3}}Q_{b,n-2})}_{S_a} + \tag{7}$$

$$M_{1,b}\underbrace{(Q_{a,n-3}\overline{Q_{a,n-2}} + \overline{Q_{a,n-3}Q_{b,n-2}})}_{S_a}$$

In view of equation (4), the value of $S_a$ corresponds to output of a MUX that selects from input signals $Q_a[n-2]$ and $Q_b[n-2]$ based on the control signal $Q_a[n-3]$.

Similarly, $M_{3,b}[n]$ can be calculated as follows:

$$M_{3,b}[n] = M_{1,a}\underbrace{(Q_{b,n-3}Q_{a,n-2} + \overline{Q_{b,n-3}}Q_{b,n-2})}_{S_b} + \tag{8}$$

$$M_{1,b}\underbrace{(Q_{b,n-3}\overline{Q_{a,n-2}} + \overline{Q_{b,n-3}Q_{b,n-2}})}_{S_b}$$

The value of $S_b$ corresponds to the output of a MUX that selects from input signals $Q_b[n-2]$ and $Q_b[n-2]$ based on the control signals $Q_b[n-3]$.

With reference to FIG. 3, in a parallel architecture, the values of $S_a$ and $S_b$ correspond to the output of MUXs 350a, 350b which are already part of another branch in the architecture. Accordingly, the output values $S_a$ and $S_b$ of MUXs 350a and 350b can be used in two or more branches which can, in some embodiments, reduce the number of multiplexers in the parallel architecture. This may also reduce the number of multiplexer levels between the circuit's inputs and outputs which may result in faster and/or lower latency circuits.

In view of this, embodiments of a PML MUX network can be designed to use intermediate MUX outputs from one DFE branch to control PML MUX(s) in another branch.

With reference to the portion of the PML MUX array identified by the dotted line 330 in FIG. 3, by applying the intermediate MUX outputs $S_a$ and $S_b$ from the i=n−2 branch to control the second PML MUX in the i=n branch, the PML output M3 in this example architecture has a 2 MUX delay compared to the 3 MUX delay in FIG. 2B. In addition, the PML MUX array in the example architecture of FIG. 3 has only 2 sets of MUXs rather than 3 as illustrated in the FIG. 2B architecture.

This use of intermediate MUX outputs can similarly be seen in the series of MUXs for the Y[n−1] branch which makes MUX selections based on Q[n−2] and the intermediate MUX value from the output of the first MUXs in the Y[n−3] branch. While not expanded fully, intermediate MUX values in the n−4 and n−5 branches can also be used as selector inputs to the n−2 and n−3 branches respectively.

FIG. 3 illustrates aspects of an example decision feedback circuit 300 which includes multiple decision feedback branches. In some embodiments, each branch may be a single-tap decision feedback equalizer. Each branch is configured to determine an output X[i] for an input Y[i]. While only 4 full branches are shown in the example in FIG. 3, any suitable number of branches may be included in the circuit 300.

In some embodiments, a decision feedback branch can include a pre-computation stage 305 configured to generate a set of tap-adjusted inputs (e.g. $Q_a[n]$, $Q_b[n]$). Each tap-adjusted input Q corresponds to a possible value of a previous output for the same DFE branch (e.g. X[n−1]).

In some embodiments, for each output value in the set of possible output values, the pre-computation stage may include a pre-computation circuit configured to add or otherwise adjust an input to the DFE branch Y[n] by a pre-computed tap value (e.g. C, −C) associated with the corresponding previous output value (e.g. +1, −1). The pre-computation stage can also include quantizers configured to quantize outputs from the pre-computation circuits into one of a set of possible output values (e.g. +1, −1). In some embodiments, the set of tap-adjusted inputs corresponds to the set of outputs of the branch's quantizers Q.

In some embodiments, a decision feedback branch can include a decision feedback stage 306 including a multiplexer circuit configured to select at least one output from the set of tap-adjusted inputs (e.g. Q[n]) based on tap-adjusted inputs from other DFE branches (e.g. Q[n−1], Q[n−2]).

In at least one DFE branch, at least one selection line for the multiplexer circuit can be an intermediate value (e.g. $S_a$, $S_b$) from a multiplexer circuit for a different DFE.

In some embodiments, the multiplexer circuit can include a series of multiplexers such as the 2-to-1 multiplexers illustrated, for example, in FIG. 3. In some embodiments, the multiplexer circuit may include individual multiplexer components (as illustrated for example by the individual MUX units in the figures) and/or a combination of gates or logic circuitry suitable for performing one or more selections, or some combination thereof.

While the multiplexer circuits in some of the figures have been illustrated as individual 2-to-1 MUX units, in some embodiments the multiplexer circuits may be created similarly through the use of larger MUXs (e.g. 4-to-1, 8-to-1, 16-to-1, etc.) or corresponding logic gates/circuitry. Based on the configuration of these larger MUXs, intermediate values from within the logic or circuitry of a larger MUX which represent an appropriate intermediate result in a first branch may be used as a selector in a second branch.

With reference to FIG. 3, the intermediate values $S_a$, $S_b$ are an output from a first multiplexer in the MUX circuit for the n−2 branch which is used both as an input to a second multiplexer in the n−2 branch and as a selector for a multiplexer in the n branch. In some embodiments, using this intermediate value for a different branch can reduce both the number of MUXs and the number of MUX delays required to calculate a branch output.

While the example in FIG. 3 illustrates the use of various intermediate values throughout the different branches, in other embodiments only a single or any number of intermediate values may be used. Generally, utilizing more intermediate values can result in fewer MUXs in the PML architecture. In the FIG. 3 example, every branch utilizes an intermediate value from another branch.

In some embodiments, multiple intermediate values from any number of different branches may be used in the one branch's MUX circuit.

Based on the equations and examples described herein, in some examples, for L lines of DFE filters, the total delay on each DFE branch is $\log_2 L$ levels of MUXs compared to $L-1$ levels of MUXs for a full array of MUXs (as illustrated in FIG. 2B). In some embodiments, the reduction in MUX network delay of this PML architecture may reduce or eliminate pipelining requirements which can, in some examples, result in circuits with smaller cell areas.

In some examples, the reduction in the number of MUXs or the overall size of the MUX circuit may result in circuits with smaller cell areas.

In some examples, shortening PML delay may reduce the overall input to output delay path, and may result in a higher circuit throughput.

In some examples, shortened delays may allow for the use of a greater number of parallel lines which may result in higher circuit throughput.

In some embodiments, the PML architecture may loop back on itself. For example, with reference to FIG. 3, instead of using the outputs from MUXs 360 illustrated in the n−4 branch, the selection inputs to the MUXs 362 in the n−2 branch may be provided by MUXs 364 in the n branch. Similarly, instead of using the outputs from MUXs 370 illustrated in an n−5 branch, the selection inputs to the MUXs 372 in the n−3 branch may be provided by MUXs 374 in the n−1 branch. In such embodiments, the n−4 and n−5 branches and MUXs 360, 370 would not be required.

More generally, for a circuit having L PML branches, tap-adjusted inputs Q[n−k] and logical combinations thereof (i.e. MUX outputs) from branch n−k can be provided by tap-adjusted inputs of branch [(n−k) modulo L] or logical combinations thereof.

While the examples above show digital feedback circuits based on 2 quantization levels (e.g. +1. −1), aspects of the present disclosure may also apply to circuits having 2 or more of quantization levels. For example, the circuit may have $2^N$ (e.g. 2, 4, 8, or 16) levels of quantization, where N is a positive integer.

For example, for a digital feedback circuit having 4 levels of quantization (e.g., −3, −1, +1, +3), the pre-computation stage for each branch can be configured to generate a set of 4 tap-adjusted inputs, and the output of the first MUX at M1 can be calculated similarly to the above. For example, with $Q_a[n]$=Quant$\{Y[n]-3C\}$, $Q_b[n]$=Quant$\{Y[n]-C\}$, $Q_c[n]$=Quant$\{Y[n]+C\}$, $Q_d[n]$=Quant$\{Y[n]+3C\}$ then:

$$M_{1,a}[n] = q_{a00}[n-1] \cdot Q_a[n] + q_{a01}[n-1] \cdot Q_b[n] + \quad (9)$$
$$q_{a10}[n-1] \cdot Q_c[n] + q_{a11}[n-1] \cdot Q_d[n]$$

$$q_{a00}[n-1] = \begin{cases} 1, & \text{if } Q_a[n-1] = 00 \\ 0, & \text{otherwise} \end{cases}$$

$$q_{a01}[n-1] = \begin{cases} 1, & \text{if } Q_a[n-1] = 01 \\ 0, & \text{otherwise} \end{cases}$$

$$q_{a10}[n-1] = \begin{cases} 1, & \text{if } Q_a[n-1] = 10 \\ 0, & \text{otherwise} \end{cases}$$

$$q_{a11}[n-1] = \begin{cases} 1, & \text{if } Q_a[n-1] = 11 \\ 0, & \text{otherwise} \end{cases}$$

$$M_{1,b}[n] = q_{b00}[n-1] \cdot Q_a[n] + q_{b01}[n-1] \cdot Q_b[n] +$$
$$q_{b10}[n-1] \cdot Q_c[n] + q_{b11}[n-1] \cdot Q_d[n]$$

-continued
$$M_{1,c}[n] = q_{c00}[n-1] \cdot Q_a[n] + q_{c01}[n-1] \cdot Q_b[n] +$$
$$q_{c10}[n-1] \cdot Q_c[n] + q_{c11}[n-1] \cdot Q_d[n]$$

$$M_{1,d}[n] = q_{d00}[n-1] \cdot Q_a[n] + q_{d01}[n-1] \cdot Q_b[n] +$$
$$q_{d10}[n-1] \cdot Q_c[n] + q_{d11}[n-1] \cdot Q_d[n]$$

These equations represent the outputs M1 ($M_{1,a}$, $M_{1,b}$, $M_{1,c}$, and $M_{1,d}$) of a first array of multiplexers 410 in the n branch's series of multiplexers. The 2-bit output $M_{1,a}[n]$ of a first multiplexer in the array of multiplexers 410 is:

$Q_a[n]$ when the first multiplexer's selector input $Q_a[n-1]$ has a 2-bit binary value of 00 which can represent, for example, −3;

$Q_b[n]$ when the first multiplexer's selector input $Q_a[n-1]$ has a 2-bit binary value of 01 which can represent, for example, −1;

Q[n] when the first multiplexer's selector input $Q_a[n-1]$ has a 2-bit binary value of 10 which can represent, for example, +1; or $Q_d[n]$ when the first multiplexer's selector input $Q_a[n-1]$ has a 2-bit binary value of 11 which can represent, for example, +3.

The output $M_{3,a}$ can be derived based on the equations in the 2-level example:

$$M_{3,a}[n] = M_{1,a} S_{c,00} + M_{1,b} S_{c,01} + M_{1,c} S_{c,10} + M_{1,d} S_{c,11} \quad (10)$$

Where $S_c$ is:

$$S_c = q_{a00}[n-3] \cdot Q_a[n-2] + q_{a01}[n-3] \cdot Q_b[n-2] + q_{a10}[n-3] \cdot Q_c[n-2] + q_{a11}[n-3] \cdot Q_d[n-2]$$

In view of equation 9, the value of $S_c$ corresponds to the output of an array of MUXs that select from input signals $Q_b[n-2]$, $Q_b[n-2]$, $Q_c[n-2]$, and $Q_d[n-2]$, based on the control signals $Q_a[n-3]$.

Figure 4:
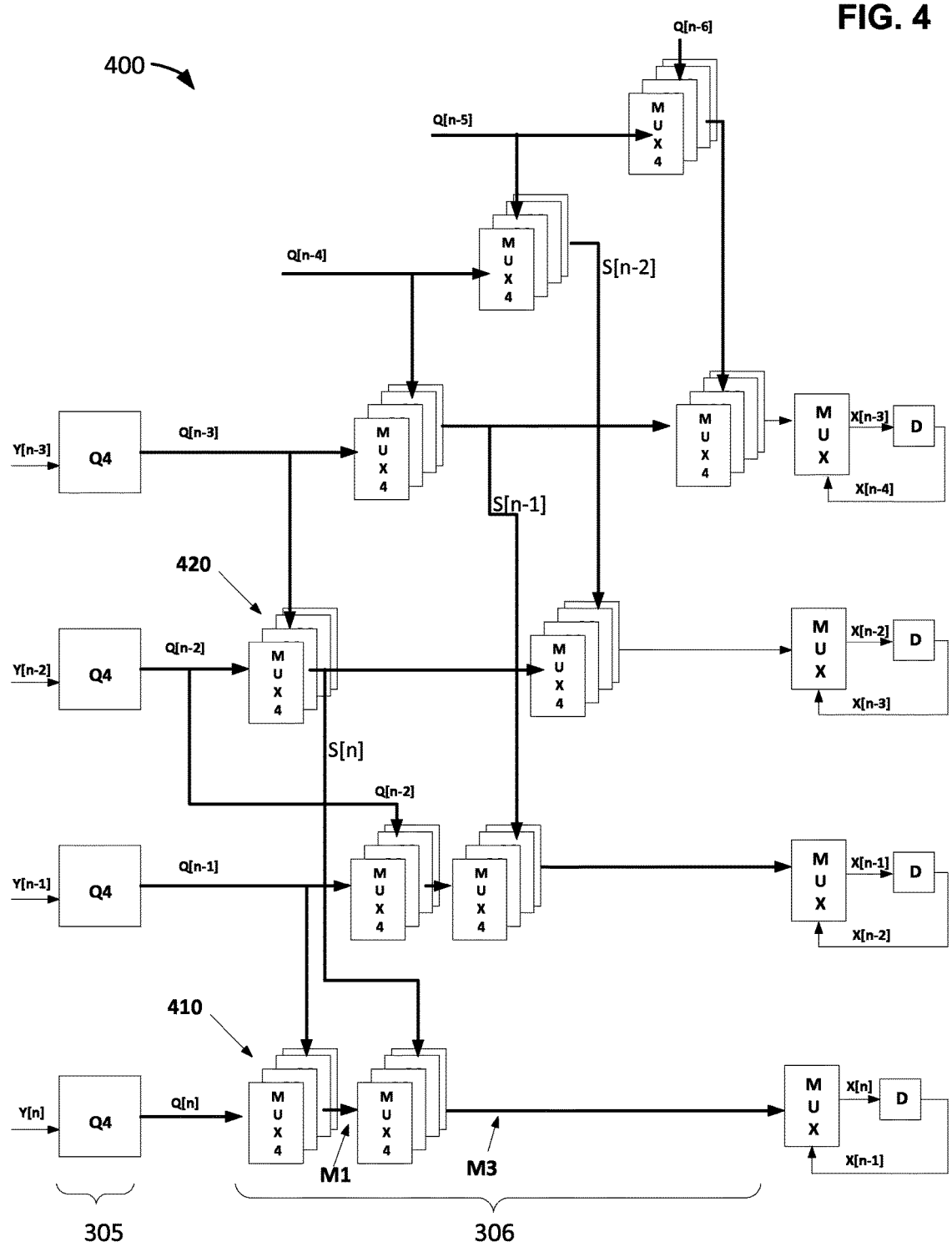
FIG. 4 is a schematic diagram showing aspects of an example 1-Tap DFE with 4 levels of quantization.

Similar to the 2-level example, with reference to FIG. 4, in a parallel architecture, the values of S[n] correspond to the outputs of MUXs 420 which are already part of another branch in the architecture.

FIG. 4 illustrates aspects of an example decision feedback circuit 300 with 4 quantizer levels. In some examples, the pre-computation stage 305 for each branch is configured to generate a set of tap-adjusted inputs Q[i] (e.g. $Q_a[i]$, $Q_b[i]$, $Q_c[i]$, $Q_d[i]$), one for each possible output value (e.g. −3, −1, +1, +3). The lines in FIG. 4 should be understood to represent multiple lines or values where applicable.

Figure 5:
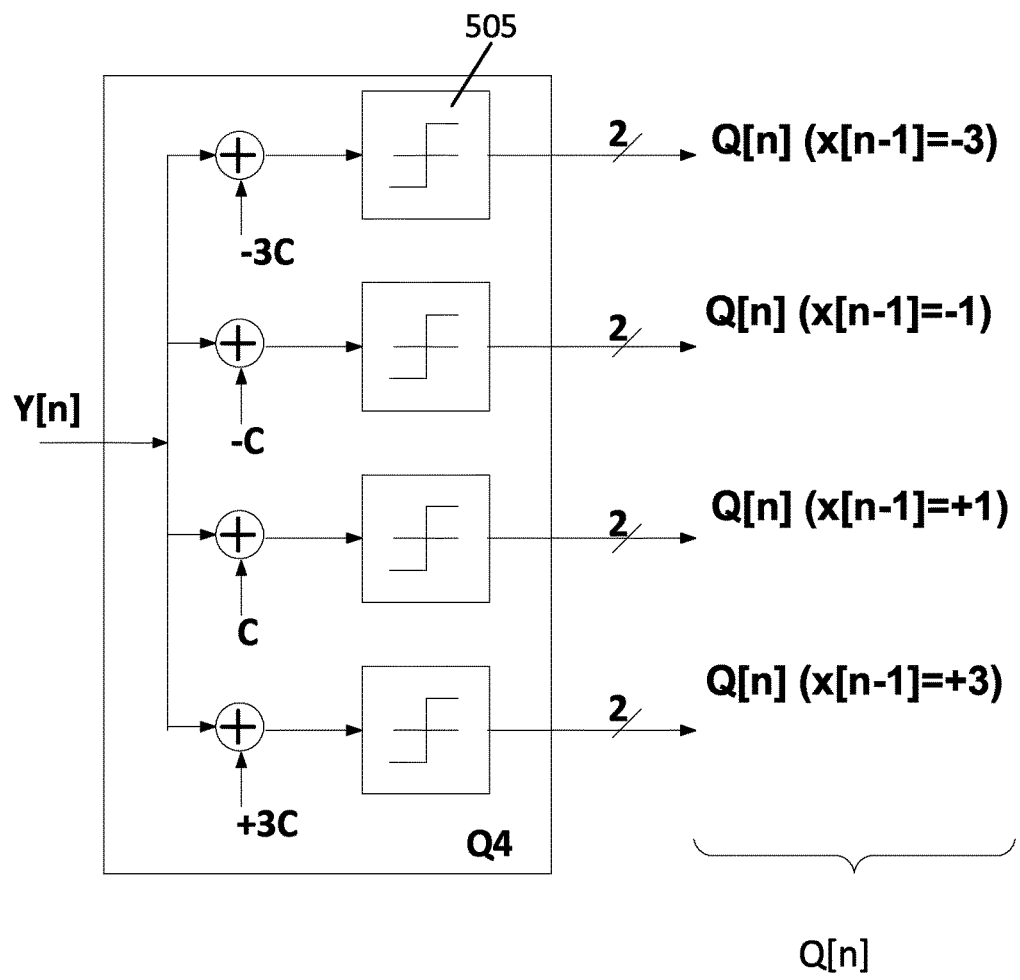
FIG. 5 is a schematic diagram showing aspects of an example pre-computation stage with 4 levels of quantization.

In some examples, the decision feedback stage 306 includes a multiplexer circuit configured to select at least one output from the set of tap-adjusted inputs based on tap-adjusted inputs from other DFE branches. As illustrated in FIG. 4, the multiplexer circuit may include 4-to-1 MUXs or any other suitable combination of gates or logic circuitry to provide the appropriate selections. FIG. 5 illustrates aspects of an example pre-computation stage 500 including 4-level quantizers 505.

Intermediate values from one branch (e.g. S[n], S[n−1], S[n−2]) can be used as selectors in a different branch to reduce the complexity of the MUX array and PML architecture.

In some embodiments, example circuits described herein may be part of larger electronic devices. For example, a decision feedback circuit 300, 400 may be part of a larger circuit, such as a serializer/deserializer device. In some examples, a decision feedback circuit 300, 400 may be part of an interface for a communication channel. For example, a decision feedback circuit 300, 400 may be part of an interface between two chips, devices, etc.

In some embodiments, circuits based on the examples described herein may be part of an equalizer device, a receiver device, or an interface portion of a larger device having another purpose.

Figure 6:
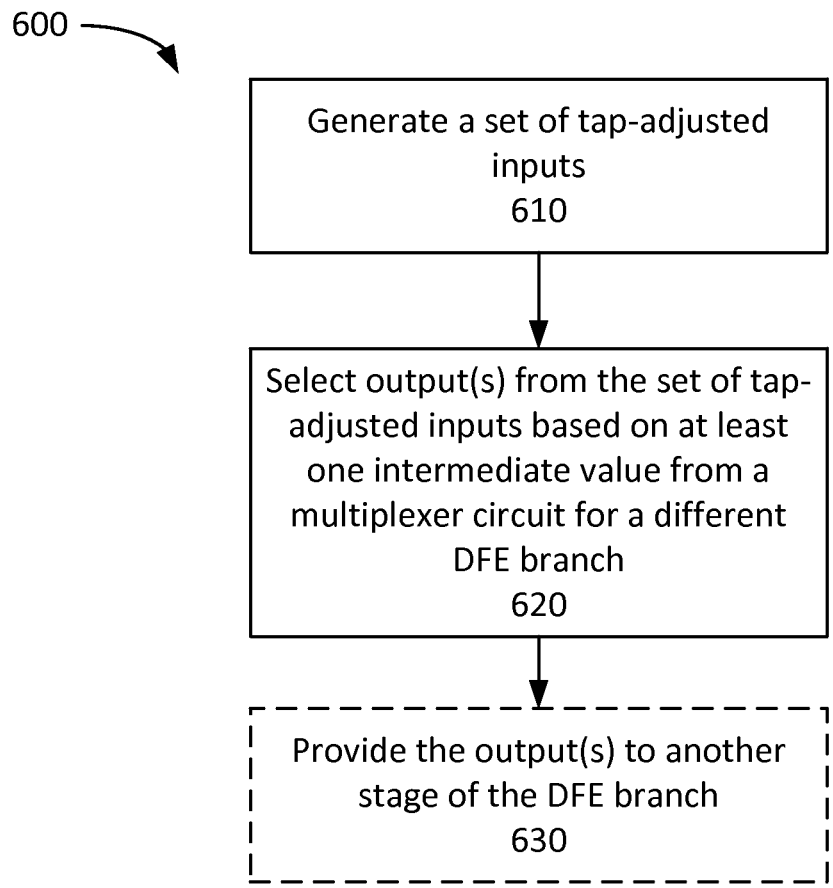
FIG. 6 is a flowchart showing aspects of an example method for decision feedback equalization.

FIG. 6 shows a flowchart showing aspects of an example method for decision feedback equalization. At 610, at least one branch of a decision feedback circuit having a plurality of decision feedback equalizer (DFE) branches generates a set of tap-adjusted inputs (e.g. Q[i]). In some examples, each tap-adjusted input for a branch corresponds to a possible value of the branch's previous output (e.g. X [i−1]).

At 620, the multiplexer circuit(s) of the one or more branch(es) selects one or more outputs from the set of tap-adjusted inputs based on at least one intermediate value from a multiplexer circuit of a second DFE branch.

At 630, the multiplexer circuit(s) of the one or more branches provides the selected output(s) from 620 to another stage of the DFE branch such as, for example, the unrolling selection MUX circuit 307.

In some examples, generating 610 the set of tap-adjusted inputs can include adjusting an input to at least one branch of the plurality of DFE branches by a pre-computed tap value associated with the corresponding possible output value; and quantizing the adjusted input into one of the set of possible output values to provide a tap-adjusted input in the set of tap-adjusted inputs. This process can be done for each possible output value.

In some examples, the method can include receiving the intermediate value from an output of a first multiplexer in the multiplexer circuit of the different DFE branch (e.g. $S_a$, $S_b$), where the output of the first multiplexer is an input to a second multiplexer in the multiplexer circuit of the different DFE branch.

In some embodiments, the method 600 can be applied to circuits where the plurality of DFE branches are single-tap (1-Tap) decision feedback equalizers.

In other embodiments, the methods, circuits and devices described herein may apply to an N-Tap architecture, for example, a 2-Tap architecture. In some examples, an N-Tap architecture may have additional logic or circuitry to generate an intermediate value from the multiplexer circuit in a first branch to control a selection line for a multiplexer in a second branch. Similar to the above, simulated circuits have shown that an example 2-Tap architecture can reduce the complexity of the multiplexer circuit by $\log_2$ and may, in some instances, reduce the multiplexer circuit delay even with the additional logic or circuitry to generate intermediate values.

In some embodiments, the method 600 can be applied for every branch in a decision feedback circuit.

In some examples, the method 600 can include determining the intermediate value by selecting from a set of tap-adjusted inputs from the different DFE branch based on a tap-adjusted input from a second different DFE branch.

Various example embodiments are described herein. Although each embodiment represents a single combination of inventive elements, all possible combinations of the disclosed elements are considered to include inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

Although the present invention and its potential advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A decision feedback circuit comprising:
   a plurality of decision feedback equalizer (DFE) branches, each DFE branch including:
   a pre-computation stage configured to generate a set of tap-adjusted inputs, each tap-adjusted input corresponding to a possible value of a previous output for the same DFE branch; and
   a decision feedback stage comprising a multiplexer circuit configured to select at least one output from the set of tap-adjusted inputs based on tap-adjusted inputs from other DFE branches;
   where at least one selection input for a first multiplexer circuit in the decision feedback stage of a first DFE branch of the plurality of DFE branches is connected to an intermediate output from a second multiplexer circuit for a second DFE branch of the plurality of DFE branches, wherein the intermediate output is an output from a first multiplexer in the second DFE branch, where the output of the first multiplexer is an input to a second multiplexer in the second multiplexer circuit of the second DFE branch.

2. The decision feedback circuit of claim 1, wherein the pre-computation stage comprises, for each of the set of tap-adjusted inputs:
   a pre-computation circuit configured to adjust an input to the DFE branch by a pre-computed tap value associated with the corresponding previous output value; and
   a quantizer configured to quantize an output from the pre-computation circuit into one of a set of possible output values to provide a tap-adjusted input in the set of tap-adjusted inputs.

3. The decision feedback circuit of claim 1, wherein an output of at least one multiplexer in the decision feedback stage of the second DFE branch is an input to a second multiplexer in the decision feedback stage of the second DFE branch and is an input to the at least one selection input in the decision feedback stage of at least the first DFE branch.

4. The decision feedback circuit of claim 1, wherein the multiplexer circuit comprises a series of multiplexers, and the intermediate output is an output of a first multiplexer in the series of multiplexers of the second DFE branch, where the output of the first multiplexer is an input to a second multiplexer in the series of multiplexers of the second DFE branch.

5. The decision feedback circuit of claim 1, wherein the plurality of DFE branches are single-tap (1-Tap) decision feedback equalizers.

6. The decision feedback circuit of claim 1, wherein at least one selection input in each DFE branch is connected to an intermediate value from the multiplexer circuit in a different DFE branch.

7. The decision feedback circuit of claim 1, wherein the decision feedback circuit is a circuit having $2^N$ levels of quantization, where N is a positive integer.

8. The decision feedback circuit of claim 1, wherein when the decision feedback circuit is a DFE with L levels, where L is a positive integer, a path between an input and an output of at least one decision feedback stage propagates through $\log_2 L$ MUX stages.

9. The decision feedback circuit of claim 1, wherein when the decision feedback circuit is a DFE with L levels, where L is a positive integer, at least one decision feedback stage consists of $\log_2 L$ MUX stages.

10. The decision feedback circuit of claim 1, wherein the intermediate output is an output of a multiplexer having input lines corresponding to a set of tap-adjusted inputs from the second DFE branch, and at least one selection input corresponding a tap-adjusted input from a third DFE branch.

11. A method for decision feedback equalization, the method comprising:
for at least a first decision feedback equalizer (DFE) branch of a plurality of DFE branches in a decision feedback circuit:
generating, with at least the first DFE branch, a set of tap-adjusted inputs, each tap-adjusted input corresponding to a possible value of a previous output for at least the first DFE branch of the plurality of DFE branches;
selecting, with a first multiplexer circuit of the first DFE branch of the plurality of DFE branches, at least one output from the set of tap-adjusted inputs based on at least one intermediate output from a second multiplexer circuit for a second DFE branch, wherein the intermediate output is an output from a first multiplexer in the second DFE branch where the output of the first multiplexer is an input to a second multiplexer in the second multiplexer circuit of the second DFE branch; and
outputting an output of the multiplexer circuit of the first DFE branch to another stage of the first DFE branch for use in the generation of an equalized signal.

12. The method of claim 11 wherein generating the set of tap-adjusting inputs comprises: for each possible output value from a set of possible output values:
adjusting an input to at least the first DFE branch of the plurality of DFE branches by a pre-computed tap value associated with the corresponding possible output value; and
quantizing the adjusted input into one of the set of possible output values to provide a tap-adjusted input in the set of tap-adjusted inputs.

13. The method of claim 11, comprising receiving the intermediate output from the output of the first multiplexer in the second multiplexer circuit of the second DFE branch.

14. The method of claim 11, wherein the plurality of DFE branches are single-tap (1-Tap) decision feedback equalizers.

15. The method of claim 11 comprising performing the steps of claim 11 for each branch in the plurality of DFE branches.

16. The method of claim 11 wherein the decision feedback circuit is a circuit having $2^N$ levels of quantization, where N is a positive integer.

17. The method of claim 11 wherein when the decision feedback circuit is a DFE with L levels, where L is a positive integer, a path between an input and an output of at least one decision feedback stage propagates through $\log_2 L$ MUX stages.

18. The method of claim 11 wherein when the decision feedback circuit is a DFE with L levels, where L is a positive integer, at least one decision feedback stage consists of $\log_2 L$ MUX stages.

19. The method of claim 11 comprising determining the intermediate output by selecting from a set of tap-adjusted inputs from the second DFE branch based on a tap-adjusted input from a third DFE branch.

20. An electronic device comprising:
a plurality of decision feedback equalizer (DFE) branches, each DFE branch including:
a pre-computation stage configured to generate a set of tap-adjusted inputs, each tap-adjusted input corresponding to a possible value of a previous output for the same DFE branch; and
a decision feedback stage comprising a multiplexer circuit configured to select at least one output from the set of tap-adjusted inputs based on tap-adjusted inputs from other DFE branches;
where at least one selection input for a first multiplexer circuit in the decision feedback stage of a first DFE branch of the plurality of DFE branches is connected to an intermediate output from a second multiplexer circuit for a second DFE branch of the plurality of DFE branches, wherein the intermediate output is an output from a first multiplexer in the second DFE branch where the output of the first multiplexer is an input to a second multiplexer in the second multiplexer circuit of the second DFE branch.

21. A decision feedback circuit comprising:
a first decision feedback equalizer (DFE) branch including:
a pre-computation stage configured to generate a set of tap-adjusted inputs, each tap-adjusted input corresponding to a possible value of a previous output for the first DFE branch; and
a decision feedback stage comprising a first multiplexer circuit configured to select at least one output from the set of tap-adjusted inputs based on tap-adjusted inputs from other DFE branches;
where at least one selection input for the first multiplexer circuit is an intermediate output from a second multiplexer circuit for a second DFE branch, wherein the intermediate output is an output from a first multiplexer in the second DFE branch where the output of the first multiplexer is an input to a second multiplexer in the second multiplexer circuit of the second DFE branch.

22. A decision feedback circuit comprising:
a first decision feedback equalizer (DFE) branch including:
a pre-computation stage configured to generate a set of tap-adjusted inputs, each tap-adjusted input corresponding to a possible value of a previous output for the first DFE branch; and
a first decision feedback stage comprising a first multiplexer circuit configured to select at least one output from the set of tap-adjusted inputs based on tap-adjusted inputs from other DFE branches;
where an intermediate output of at least a first multiplexer in the first multiplexer circuit is connected to an input to a second multiplexer in the multiplexer circuit and is connected to at least one selection input in a second decision feedback stage of a second DFE branch.

23. The decision feedback circuit of claim 22, wherein at least one selection input for the first multiplexer circuit is connected to a second intermediate output from a third decision feedback stage of a third DFE branch, wherein the second intermediate output is an output from a first multiplexer in the third DFE branch where the output of the first multiplexer is an input to a second multiplexer in the multiplexer circuit of the third DFE branch.

* * * * *